Feb. 15, 1966   E. J. HUNKELER   3,234,852
GEAR CUTTING MACHINE
Filed March 23, 1964   7 Sheets-Sheet 1

INVENTOR.
ERNST J. HUNKELER
BY Richard W. Treverton
ATTORNEY

Feb. 15, 1966  E. J. HUNKELER  3,234,852
GEAR CUTTING MACHINE
Filed March 23, 1964  7 Sheets-Sheet 2
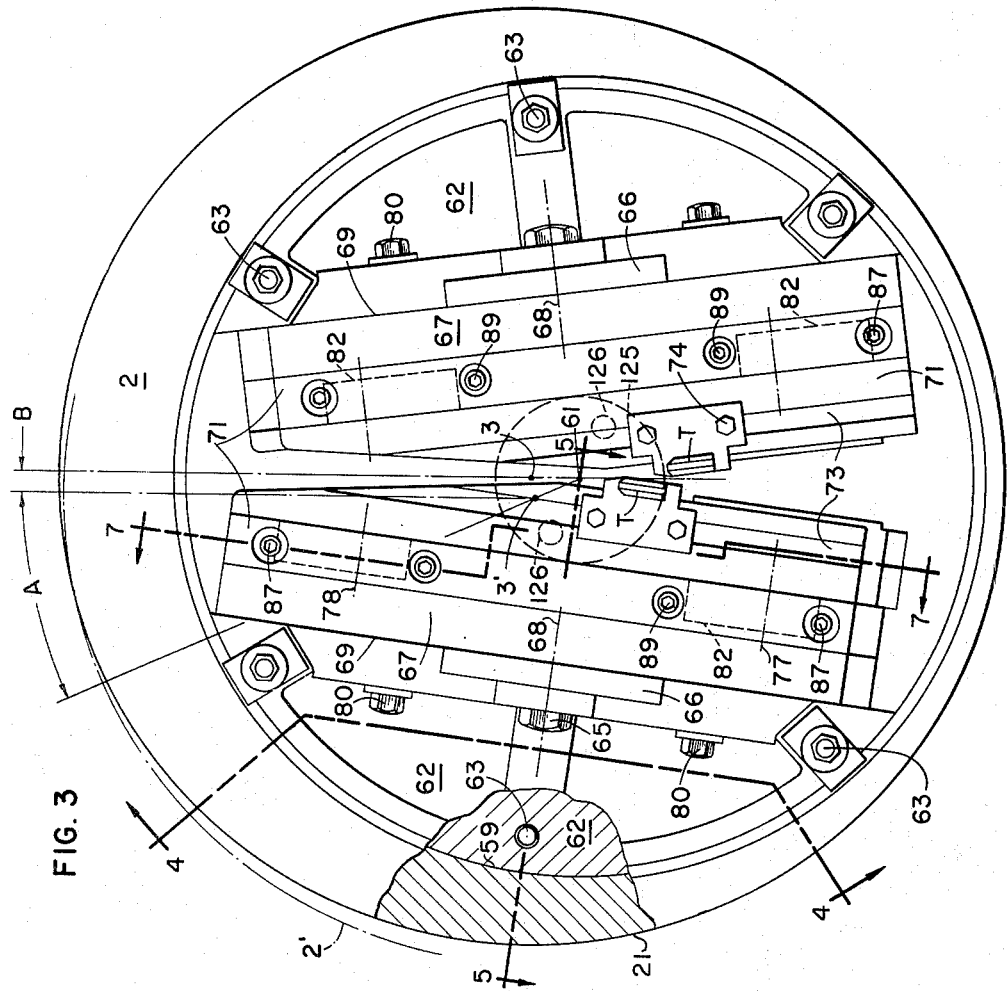
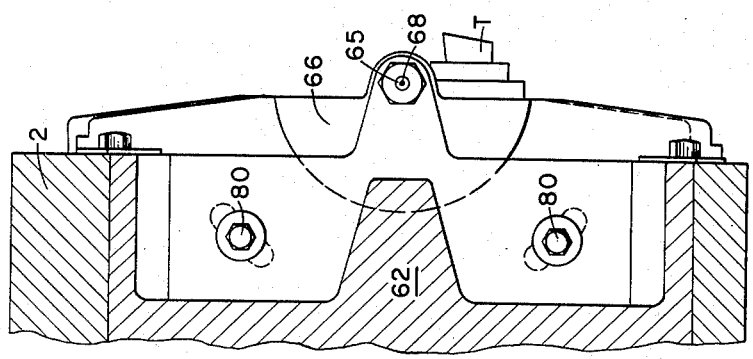

Feb. 15, 1966   E. J. HUNKELER   3,234,852
GEAR CUTTING MACHINE
Filed March 23, 1964   7 Sheets-Sheet 3
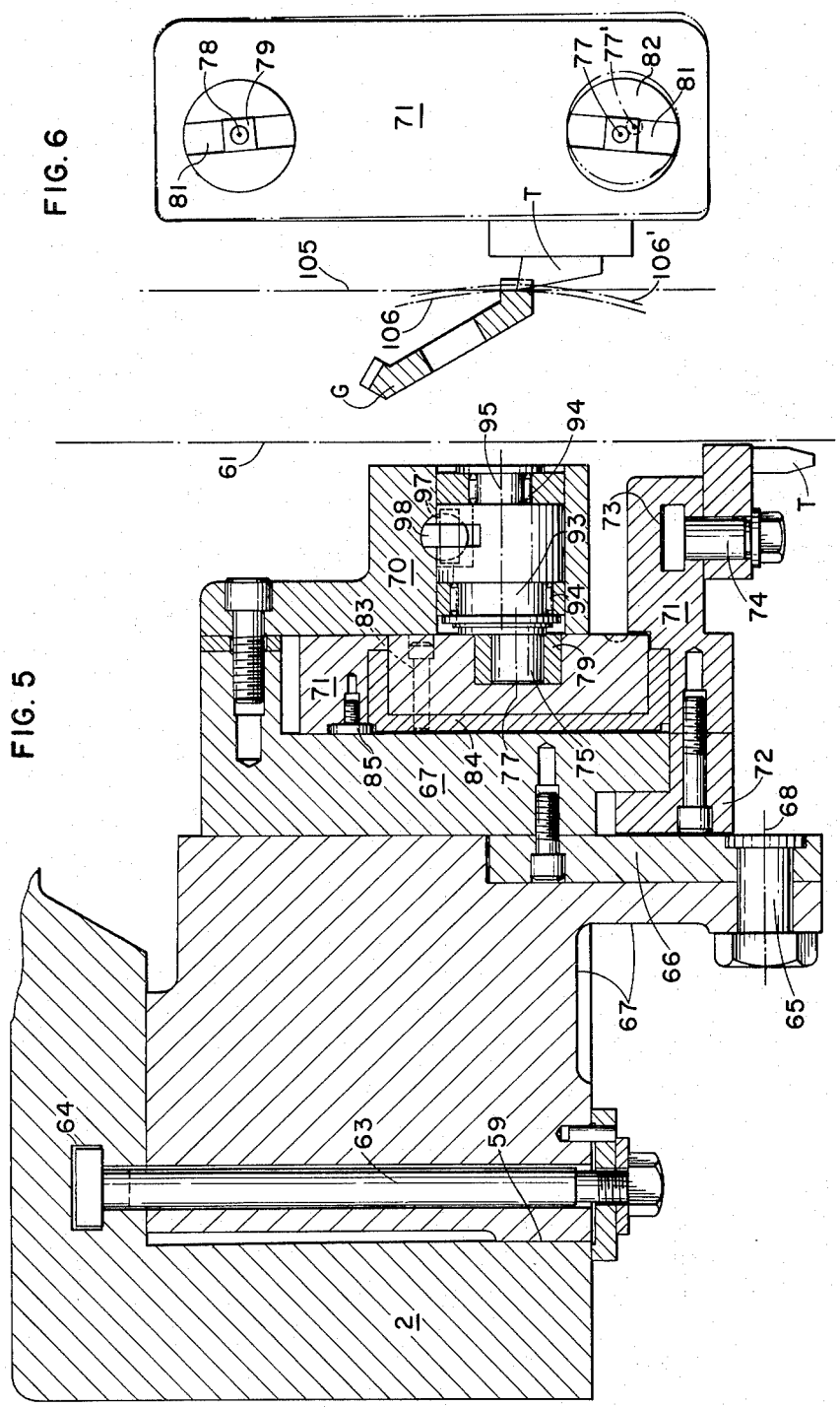

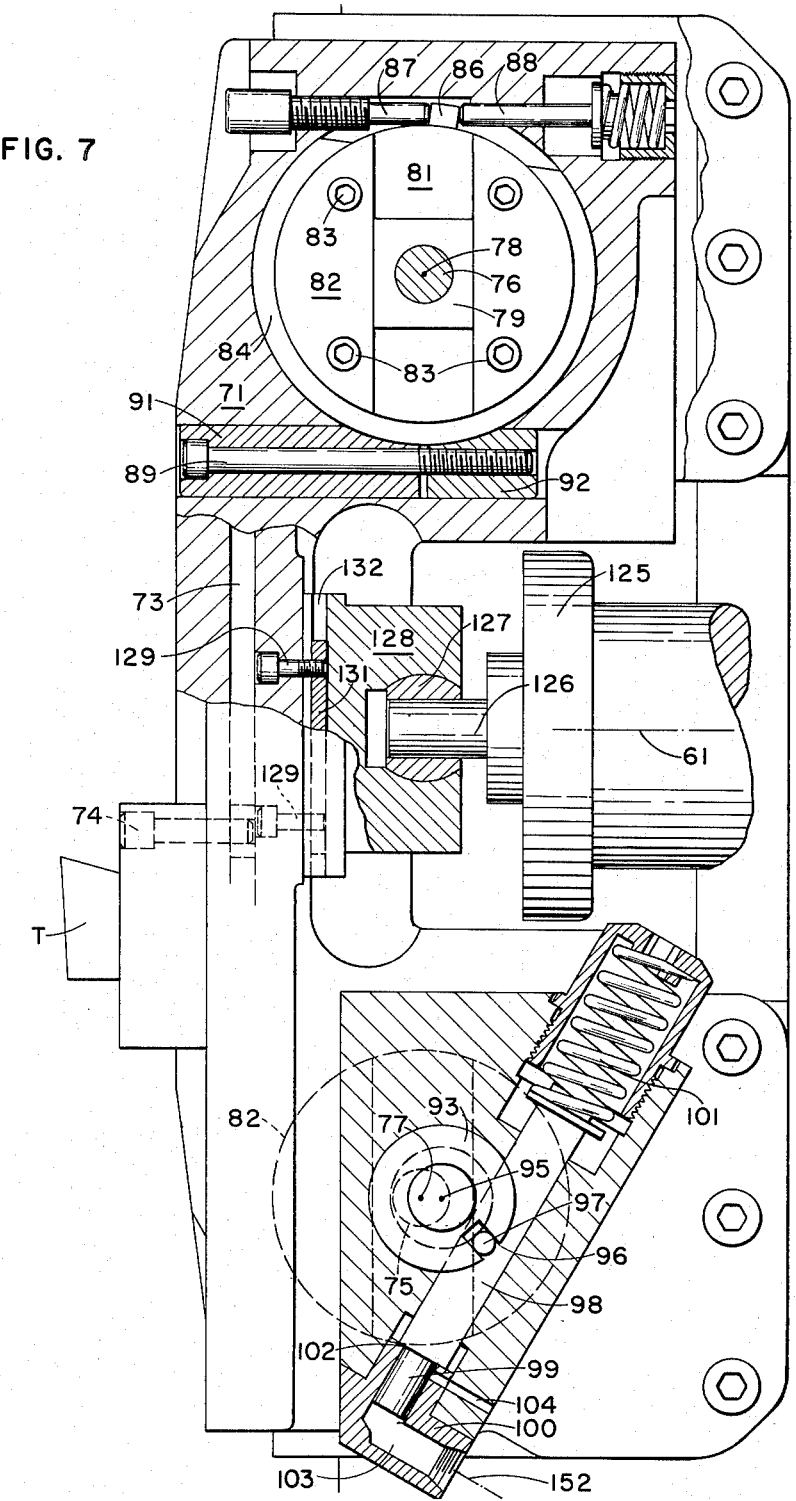

Feb. 15, 1966  E. J. HUNKELER  3,234,852
GEAR CUTTING MACHINE
Filed March 23, 1964  7 Sheets-Sheet 5

Feb. 15, 1966    E. J. HUNKELER    3,234,852
GEAR CUTTING MACHINE
Filed March 23, 1964    7 Sheets-Sheet 7

United States Patent Office 3,234,852
Patented Feb. 15, 1966

3,234,852
GEAR CUTTING MACHINE
Ernst J. Hunkeler, Fairport, N.Y., assignor to The Gleason Works, Rochester, N.Y., a corporation of New York
Filed Mar. 23, 1964, Ser. No. 354,048
34 Claims. (Cl. 90—6)

The present invention relates to gear cutting machines, especially machines for generating straight and skew bevel gears.

An object of the invention is a machine of compact and rigid form, adapted for cutting at high speeds. Contributing to compactness and rigidity, and also to accessibility of the work spindle for the loading and unloading of workpieces, the machine is so arranged that the adjustment of the work head to accommodate work gears of different cone angles, and the motion of the work head between work loading and cutting positions, are about vertically spaced horizontal axes.

Another object is a simplified tool supporting mechanism which enables the cutting of gears of either straight bevel or skew bevel form, either with or without lengthwise crowning of the teeth, and which requires a minimal overhang of the tools.

Another object is a mechanism for counteracting torsional vibrations which are induced in the rotatable cradle or tool support by reciprocation of the tools.

Still another object is a machine whose generating train, connecting the work spindle and cradle, is of an improved arrangement requiring only a few change gears to produce gears of all tooth number ratios within the range of the machine.

The foregoing and other objects and advantages of the invention will appear from the following description of the preferred embodiment illustrated in the accompanying drawings, wherein:

FIG. 3 is a front view of the tool-carrying cradle;

Figures 8, 9, 10:
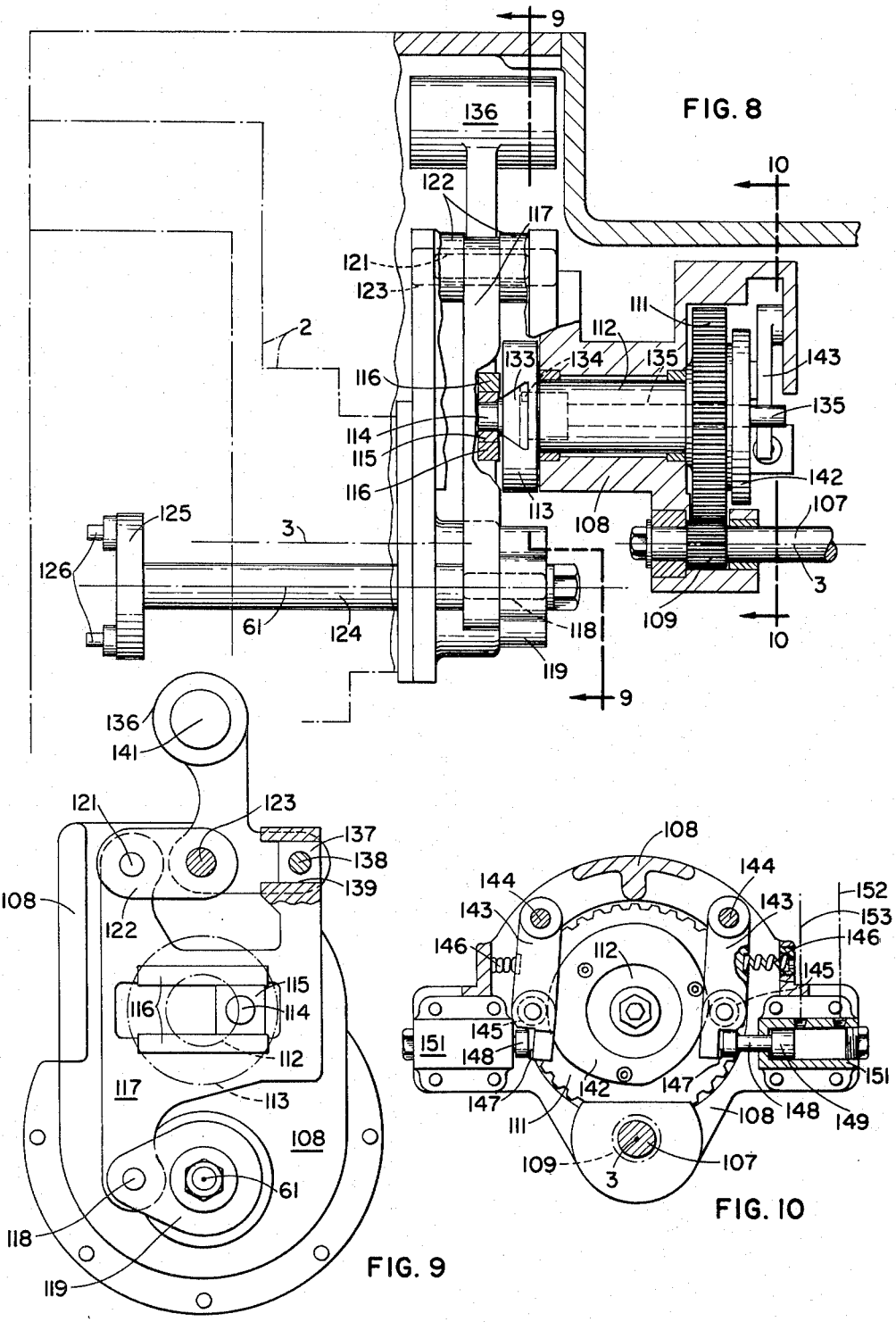
Figure 11:
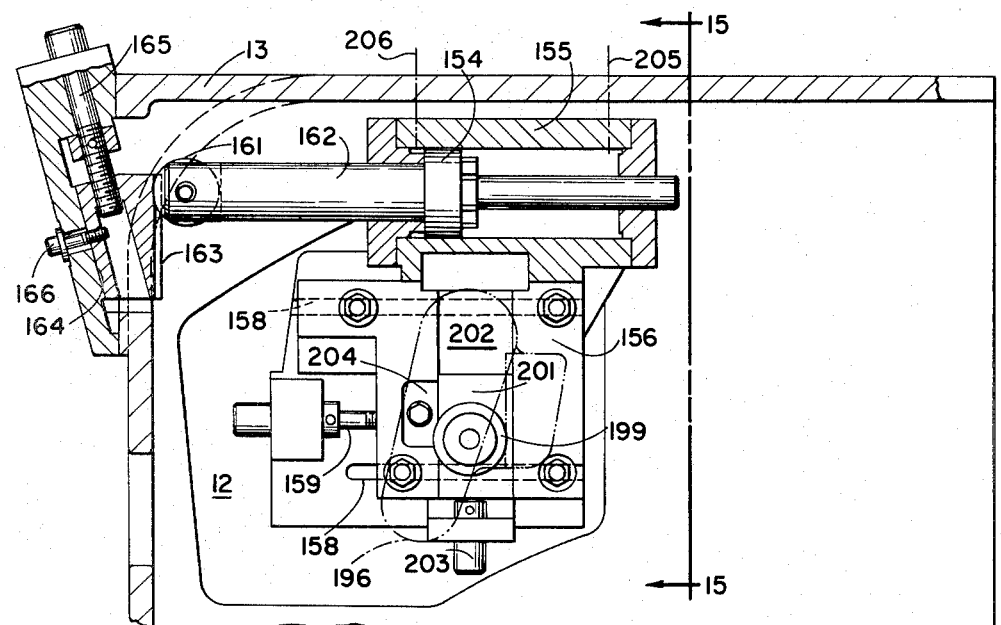
Figure 12:
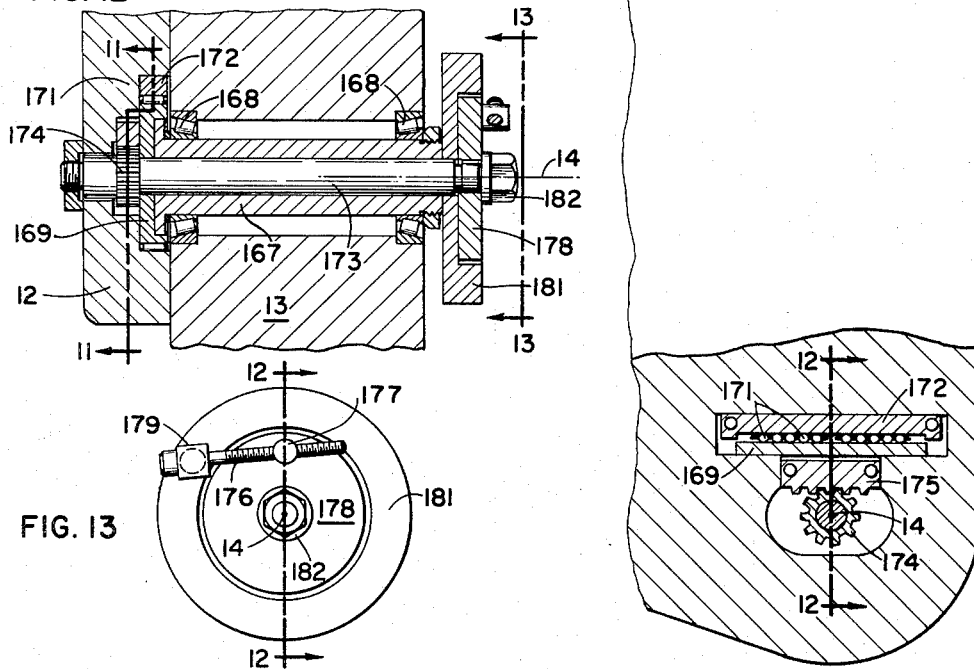
Figure 13:
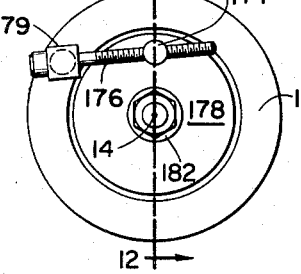
Figures 14, 15:
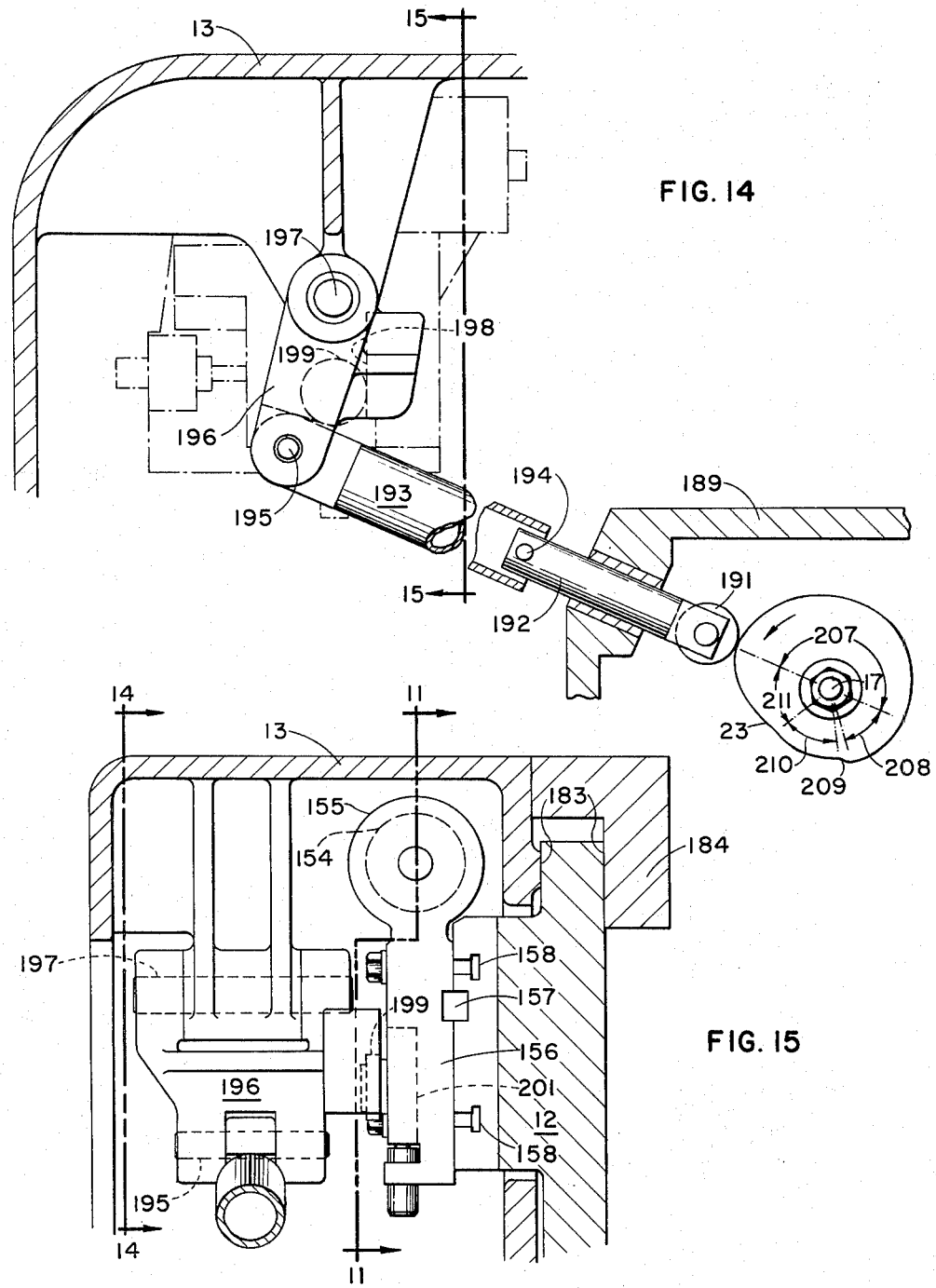

FIGS. 4 and 5 are sections approximately in planes 4—4 and 5—5 of FIG. 3;

FIG. 6 is a diagrammatic view in the same plane as FIG. 7, illustrating the motions of one of the tool slides on the cradle;

FIG. 7 is a sectional view approximately in plane 7—7 of FIG. 3;

FIG. 8 is a sectional view through the cradle, in a plane containing the cradle axis, showing the tool drive mechanism;

FIGS. 9 and 10 are cross-sections, approximately in planes 9—9 and 10—10 of FIG. 8;

FIG. 11 is a vertical section, parallel to the cradle axis and in approximately plane 11—11 of FIGS. 12 and 15, illustrating supporting structure for the work head of the machine;

FIG. 12 is a detail section in plane 12—12 of FIG. 11;

FIG. 13 is a detail elevation in plane 13—13 of FIG. 12;

FIG. 14 is a vertical section parallel to FIG. 11 and in plane 14—14 of FIG. 15; and FIG. 15 is a vertical section in plane 15—15 of FIGS. 11 and 14.

Figure 1:
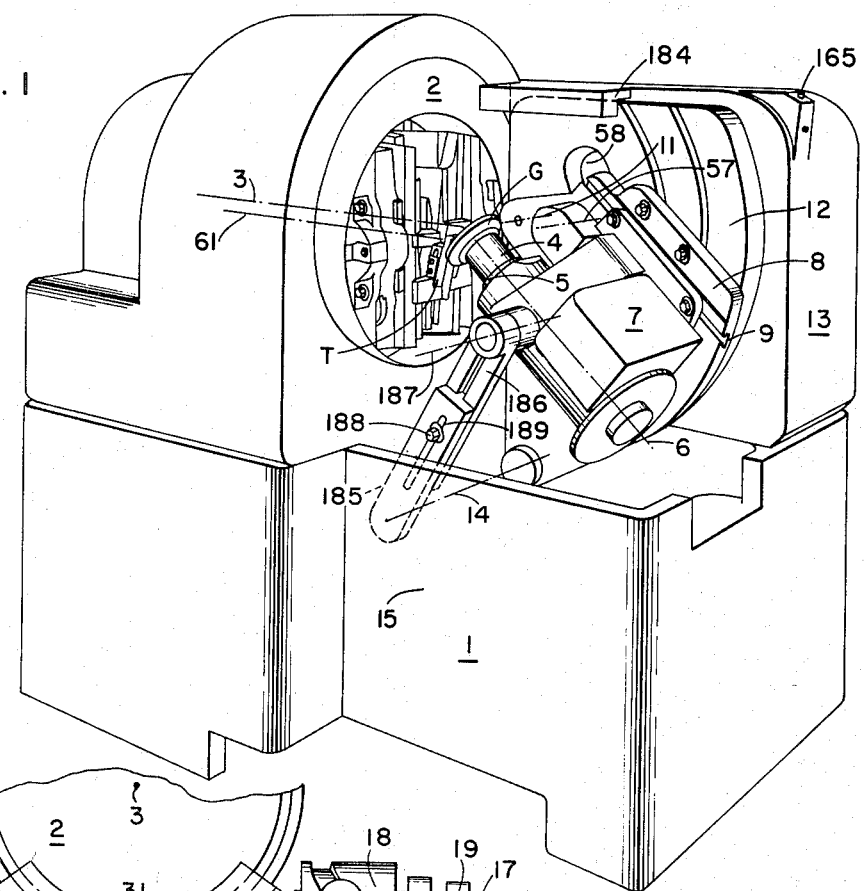
FIG. 1 is a perspective view of the machine.

Referring to FIG. 1, the machine comprises a frame 1 supporting a cradle 2 for rotation about horizontal axis 3. The cradle supports a pair of tools T for reciprocation thereon in generally upright paths, the tools cutting on opposite sides of a tooth of a work gear G. The work gear is supported in a suitable chuck 4 on a work spindle 5 that is rotatable on axis 6 in a work head 7. The latter is supported on a swinging base 8 for rectilinear adjustment thereon, along guide way 9, in the direction of work spindle axis 6. The swinging base 8 is angularly adjustable, about horizontal axis 11, on advance-withdraw plate 12, which itself is angularly movable on column 13 of the frame 1, about a horizontal axis 14.

The adjustment of the work head and swinging base on plate 12 accommodates work gears of different cone angles; for gears of half cone angles of less than 90° the axis 6 inclines downwardly away from the cradle. The motion of plate 12 about axis 14 is employed to advance the work G to the tools T or to withdraw it therefrom for tooth-to-tooth indexing, and, by a greater withdrawal, to bring it to loading position well clear of the tools. Axis 14 is so far below axis 11 that the advance-withdrawal path of the work is nearly horizontal. Axis 11 intersects work spindle axis 6 at right angles, and, in the advanced position of plate 12 also intersects cradle axis 3 at right angles. The arrangement described is such that regardless of the angular adjustment about axis 11, the work gear G is very close to the operator's station adjacent side 15 of the machine and is readily accessible for loading, unloading and observation during cutting.

Figure 2:
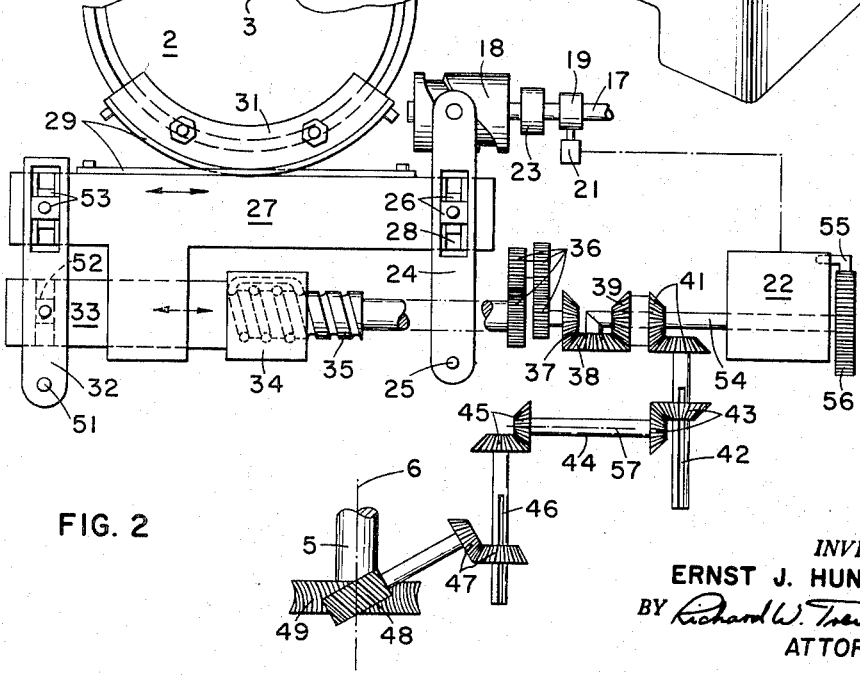
FIG. 2 is a diagram of the generating train and the drive therefor.

As shown diagrammatically in FIG. 2, the drive of the machine comprises a shaft 17 driven by a motor, not shown, through suitable reduction gearing, the shaft having secured thereon a cam 18 for actuating the generating train of the machine, a cam 19 for actuating a valve 21 which controls a work indexing mechanism 22, and a feed cam 23 which effects withdrawal of the plate 12 preceding each indexing of the work. Cam 18 oscillates a lever 24 which is fulcrumed at 25 to the frame 1 and through pivotally connected slide blocks 26 oscillates a slide 27 on the frame. One of blocks 26 is slidable in a guide groove 28 in slide 27, and the other block 26 is adjustable in lever 24, radially of fulcrum 25, to adjust the stroke of slide 27. Flexible steel bands 29 connect slide 27 to an arcuate segment 31 secured to the cradle 2, so that the latter is rotated back and forth about its axis 3 upon reciprocation of the slide. The segment 31 is adjustable relative to the cradle, about axis 3, to vary the phase relation between the cradle and cam 18, so that the paths of the tools T may be substantially upright at the mid-point of the gear tooth generation, as is required by the disposition of work spindle axis 6 in a vertical plane. This disposition results in the reaction from the cutting forces on the tools being downward into the supporting foundation for the machine, either vertically or at a small angle to the vertical, rather than laterally as has heretofore been conventional, and is intended to lessen vibration of the machine at high cutting speeds.

The generating train, which connects cradle 2 and work spindle 5, includes the segment 31, bands 29 and slide 27, and further comprises a lever 32, a slide 33 having rigid therewith a ball-nut 34, a screw 35 threaded to the ball-nut, ratio-of-roll change gears 36, one of which is on screw 35, differential gears 37, 38 and 39, bevel gears 41, splined shaft 42, bevel gears 43, shaft 44, bevel gears 45, splined shaft 46, bevel gears 47 and final reduction worm and worm wheel, 48, 49. Lever 32 is fulcrumed to the frame at 51, pivotally supports a block 52 that is slidable in a transverse groove in slide 33, and also carries pivoted blocks 53. One of the latter is slidable in a transverse groove in slide 27 and the other is adjustable along the lever, radially of fulcrum 51. By this adjustment, which varies the stroke of slide 33 relative to that of slide 27, fine changes may be made in the ratio-of-roll between cradle 2 and spindle 5. Only a few change gears 36 are required for large changes in this ratio, to enable the cutting of gears of all cone angles within the range of the machine. The ball-nut and screw 34, 35 converts the reciprocatory motion of slide 33 into reversing rotation of screw 35, this screw being rotatable but axially immovable in the frame. The work spindle is intermittently advanced angularly, for tooth-to-tooth indexing of the work gear, by rotation introduced through a shaft 54 which carries a spider on which differential planet gear 38 is rotatable. The shaft 54 is turned, through the angle required for indexing of the work, upon each operation of index mechanism 22, controlled by valve 21. After each such rotation of shaft 54, a pawl 55 operated by mechanism 22 engages in a notch of an index plate 56 on shaft 54, to hold the latter against rotation until the start of the next indexing operation. The gears 36 to 39 and 41, and the mechanism 22, are mounted in frame 1; shaft 44 extends on axis 57 through arcuate slot 58, FIG. 1, in plate 12, and is supported in swinging base 8, as is also shaft 46. Bevel gears 47 and the final reduction gears are mounted in the work head 7.

Refering to FIGS. 2 to 7, the cradle 2 has an inner cylindrical surface 59 whose axis 61 is eccentric of cradle axis 3. Angularly adjustable on this surface are a pair of tooth angle adjustment brackets 62 which are secured to the cradle by bolts 63 whose heads are anchored in a circular T-slot 64 in the cradle, concentric of axis 61. Pivoted to each bracket by a pin 65 is a plate 66 rigidly secured to a tool guide arm 67, the axis 68 of the pin being perpendicular to and intersecting axis 61. Each guide arm has a plane surface 69 clamped to a like surface of a bracket 62 by screws 80 which extend through arcuate slots in the arm to permit adjustment of the arm about the pivot axis 68. A gib 70 is rigidly secured to each arm and cooperates therewith in supporting a tool slide 71 for reciprocation on the arm in a plane parallel to surface 69, i.e. perpendicular to axis 68. Contributing to such sliding support there is a gib 72 rigidly secured to each tool slide. The tools T are adjustable along T-slots 73 in the slides 71, being secured to the slides by screws 74.

For guiding each tool slide in its plane of reciprocation determined by the gibs, each gib 70 supports two spaced guide pins, 75 and 76, whose axes 77 and 78, respectively, are perpendicular to said plane. Each pin pivotally supports a block 79 that is slidable in a straight guide groove 81 in a guide disc 82 supported by the related slide 71. The four guide discs, two on each slide 71, are identical. Each of them is rigidly secured by screws 83 to the bottom of a cup-shaped member 84 rotatable in its slide 71 and retained therein by screws 85. The flange of each member 84 is cut away to provide a finger 86 for engagement by an adjusting screw 87 in the slide, by means of which the members 84, 82, may be rotated to change the inclinations of the slots 81. A spring-backed plunger 88 also acts against each finger 86, to hold it against the adjusting screw. After adjustment the member 84 is clamped to the slide 71 by tightening a screw 89 which extends through a sleeve 91 supported by the slide and into a nut 92, the sleeve and nut being recessed to conform to the cylindrical surface of the member.

Pins 76 are rigidly secured to gibs 70, but as shown in FIGS. 5 and 7, each of pins 75 has an eccentric portion 93 in the gib rotatable on needle bearings 94 about axis 95. Portion 93 is radially slotted, at 96, to receive a cross-pin 97, this pin being carried by a rod 98 of a piston 99 that is slidable in the cylinder bore of a block 100 secured to the gib. A spring 101 urges the piston and rod 99, 98 to their downward limit position shown in FIG. 7 wherein shoulders 102 of the rod abut block 100. Oil under pressure applied through passage 103 moves the piston upwardly, rotating the pin 76 counterclockwise about axis 95 in FIG. 7 to thereby move the related block 79 and guide member 82 also to the right in this view, thus retracting the tool T from the cut. This tool relieving motion of pistons 99 is effected prior to each return stroke of the tools, by means to be described hereinafter. Upward motion of the piston 99 is limited by the piston uncovering a port 104, which allows the exhaust of oil from passage 103.

By adjustment of brackets 62 relative to each other about axis 61 the paths of reciprocation of the tools T may be made to suit the angular spacing of opposite sides of the gear teeth to be cut. Also by adjustment of both brackets 62 in the same direction about axis 61, and concomitant adjustment of the cradle (by means of segment 31, FIG. 2) through an equal angle in the opposite direction about axis 3, the paths of the tools may be offset from the cradle axis for the cutting of skew bevel gears. For example, referring to FIG. 3, by adjusting the brackets through angle A counterclockwise about axis 61, and then adjusting the cradle clockwise about axis 3 through an equal angle, the relative effect is that the cradle axis 3 is shifted, relative to the brackets, to position 3' and the cradle outline to the position shown in broken lines at 2'. The actual result is that the paths of the tools are shifted to the right of the cradle axis by distance B.

The adjustment of guide slots from positions in which they are aligned, as in FIG. 7, to oppositely inclined relation, as shown in FIG. 6, results in the cutting path of the tool T being changed from rectilinear, as indicated at 105, to curved, as shown at 106, to thereby crown the teeth of the work gear G. The effect of the tool relief motion effected by pistons 99, exaggerated in FIG. 6, is to shift axis 77 to position 77' and thereby withdraw the path of tool T during its return stroke to position 106', so that the tool's cutting edges clear the surfaces being cut. The effect of adjusting the guide arms 67 about axes 68 is to vary the inclination of the mean cutting path of the tool, represented by line 105, relative to the plane of rotation of the cradle. This adjustment, which enables the root plane of the tooth slots to be inclined to the plane of cradle rotation, is employed when cutting skew bevel gears, and sometimes also when cutting straight bevel gears, usually for tooth profile curvature control.

The drive for the tools is from the same motor that drives shaft 17, FIG. 2, but if desired could be from a separate motor. The drive is through shaft 107, FIG. 8, which is rotatable about axis 3 in a multipart bracket 108 secured to the cradle 2. A pinion 109 on the shaft drives a gear 111 on a crank shaft 112 whose crank cheek and crank pin are designated 113 and 114 respectively. A block 115, FIGS. 8 and 9, on pin 114 is slidable on ways 116 of a cross-slot in a swinging link 117 that is pivoted by pin 118 to a lever 119 and by pin 121 to two parallel links 122. The links 122 are pivoted by a pin 123 to bracket 108 while lever 119 is secured to shaft 124 which is rotatable in the cradle 2 and its bracket 108 on axis 61. Shaft 124 carries a circular cheek 125 of a double lever having drive pins 126 for the two tool slides 67. Referring to FIG. 7, each pin 126 is rotatable and axially slidable in a larger diameter cross-pin 127 that is rotatable in a block 128 adjustably secured to the related tool slide 71 by screws 129. The latter are threaded into a retainer 131 in a T-slot 132 in the block 128 that parallels slot 73 in the slide. The adjustment of block 128 afforded by this arrangement enables the tool slides to have their guides 81, 82 restored to center with respect to axes 77, 78 (when the slides are at the mid-points of their strokes). Such centered relation is disturbed by the afore-described adjustments of the guide arms 67 about axes 61 and 68. The pins 126, 127 constitute an articulated connection which enables the tool drive to reciprocate the tool slides in any such adjusted position of guide arms 67.

The links 117, 122, lever 119 and bracket 108 constitute a parallelogram linkage which causes the tools to reciprocate with substantially harmonic motion upon rotation of crank 112–115. The length of stroke of the tools may be adjusted by varying the throw of the crank. For this purpose crank pin 114 is mounted on a radial slide 133 in cheek 113, and this slide has a cross-slot engaged by an eccentric 134 on a shaft 135 telescoped within crank shaft 112. The arrangement is such that by rotating shaft 135 relative to the crank shaft, the slide 133 and crank pin 114 are adjusted radially of cheek 113.

The intertia of the tool slides causes a reversing torque to be applied to the cradle when the slides are reciprocated, this torque tending to oscillate the cradle about its axis 3 in time with the reciprocation and thereby induce vibration in the machine when operated at high cutting speeds. In order to counteract these undesirable effects, and thereby improve the quantity and quality of gears produced on the machine, a counterweight 136 is pivoted to bracket 108 of the cradle by pin 123, FIGS. 8 and 9. A block 137 is pivoted to the counterweight by a pin 138 and is slidable in a cross-guideway 139 in swinging link 117. By this arrangement the weight is moved in torquewise opposition to the tool drive lever 119. For example, referring to FIG. 9, when the link 117 swings downwardly, to move the lever 119 counterclockwise about axis 61 the counterweight is swung clockwise about the axis of pin 123. In the illustrated embodiment the counterweight includes a core 141 of lead, so that its center of mass lies approximately in a radial plane containing axes 3 and 61 and the axis of pin 123; and the swinging motion of this center of mass about pin 123 is approximately circumferential of the cradle. Accordingly during operation of the machine, the inertia of the mass imposes an oscillating torque on the cradle, about cradle axis 3, which substantially opposes the oscillating torque about this axis which results from the inertia of the tool slides.

For actuating the two tool relieving pistons 99, FIG. 7, in time with reciprocation of the tools, a cam 142, FIGS. 8 and 10, is secured to crank shaft 112. Cam follower levers 143 are pivoted at 144 to bracket 108 and carry rollers 145 which are held against the cam by springs 146. Bearings 147 on the levers abut rods 148 of pistons 149 which are reciprocable in cylinders 151 secured to the bracket, there being one such piston for each piston 99. On each piston stroke outward from shaft 112 fluid is forced from the cylinder to passage 103, FIG. 7, through a flexible hydraulic line schematically indicated at 152, to effect relief motion of the related tool T. At the conclusion of each inward stroke of piston 149 the cylinder chamber is filled with oil from a low pressure line 153 which extends from the lubricating oil pump (not shown) of the machine. As shown, the follower rollers 145 are on opposite sides of cam 142, and the latter is in such phase relation to the tool-stroking mechanism that each tool T is held withdrawn from the work during its return stroke. Preferably the displacement of each piston 149 is sufficiently greater than that of related piston 99 to provide some exhaust from port 104, FIG. 7, assuring a full tool-relief stroke of piston 99.

The assembly comprising the work head 7, swinging base 8 and advance-withdraw plate 12, is withdrawn by gravity about axis 14 from cutting position to loading position, clockwise in FIG. 1 and counterclockwise in FIG. 11. The rate of such withdrawal is controlled by a piston 154 reciprocable in a cylinder 155, FIGS. 11 and 15, this piston also acting to advance the assembly to cutting position. The cylinder is integral with a bracket 156 that is adjustable on plate 12 along a guideway 157 and T-slots 158, which are horizontal when the plate is in its advanced position. After such adjustment, which is effected by means of screw 159, the bracket is clamped to the plate by bolts anchored in the T-slots. This adjustment is made in accordance with the depth of the tooth slots to be cut in the work gears G. A roller 161 on rod 162 of piston 154 rolls on a bearing block 163 on frame column 13. This block is adjustable on inclined surface 164 of the column by means of adjusting screw 165, and after such adjustment is secured by means of a screw 166. The adjustment of the block determines the infeed of the work between rough cutting and finish cutting, as will be further explained later on.

In order that the adjustment effected by screw 159 will not change the inclination of the work spindle or displace the spindle vertically, the advance-withdraw plate 12 is adjusted relative to the axis 14 by the same amount and in the same direction as the adjustment by screw 159. For this purpose, referring to FIGS. 11, 12 and 13, a tubular shaft 167 is rotatable in frame column 13 on tapered roller bearings 168 and has secured rigidly thereto a guide plate 169 supporting bearing rollers 171 on which rests a straight guide 172 secured to plate 12. Rotatable in shaft 167 is a shaft 173 having thereon a pinion 174 meshing a rack 175 secured to the plate. By rotation of shaft 173, relative to shaft 167 and guide plate 169, the pinion adjusts the rack and plate 12 relative to axis 14 in a direction parallel to screw 159. For making this adjustment a screw 176 is threaded to a pin 177 rotatably supported by a disc 178 keyed to shaft 173, the screw 176 being rotatable in a block 179 that is pivoted to a disc 181 fast on the shaft 167. After such adjustment the plate 12 is clamped to guide plate 169 and shaft 167 by tightening a nut 182 that is threaded o shaft 173.

The plate 12 is thus pivoted by bearings 168 for its advance-withdraw motion. It is further guided for such motion by sliding engagement on parallel vertical surfaces 183, perpendicular to axis 14, on frame column 13 and a gib 184 secured to the upper portion of the frame column, FIGS. 1 and 15. An adjustable-length brace, FIG. 1, further supports the work head, particularly against heavy cutting loads. This brace comprises a lower section 185 pivoted on axis 14 to the side of the frame opposite column 13, and an upper section 186 pivoted on a parallel axis 187 to the side of work head 7 opposite to that secured to swinging base 8. Sections 185 and 186 are secured together by a clamp screw 188 which extends through an elongated slot 189 in section 186. This screw is loosened to enable adjustment of the work head on the swinging base 8 and adjustment of the latter on the advance-withdraw plate.

Referring to FIG. 14, the shaft 17 supporting feed cam 23 is journaled for rotation in a bracket 189 secured to frame 1. A follower roller 191 for the cam is carried by a rod 192 slidable axially in a bore in the housing. A connecting rod 193, pivoted at 194 to rod 192, is also pivoted at 195 to a lever 196 that is fulcrumed to frame column 13 by pin 197. The lever, which is shown in broken lines in FIG. 11, has a plane surface 198 for contact with a roller 199 carried by advance-withdraw plate 12. Surface 198, when engaged by the roller 199 with the plate 12 in its advanced limit position, is vertical; and the roller is vertically adjustable on the plate to change the effective length of the lever arm 197–199. To enable such adjustment the roller is supported by a slide 201 mounted in a guideway 202 in bracket 156. This guideway is vertical in the advanced position of the plate 12. Adjustment of slide 201 is by means of a screw 203, after first loosening a clamp gib 204.

Referring to FIGS. 11 and 14, after a work gear or gear blank G has been placed on the machine, with the plate 12 in its withdrawn or loading position, hydraulic pressure is applied by suitable valve, not shown, to the right end cylinder 155 through a hydraulic line 205, shown schematically in FIG. 11, a line 206 leading from the left end of the cylinder being placed on exhaust by the valve. This causes the piston 154 to move to the left in the cylinder and, by reaction of roller 161 against stationary block 163, advances cylinder 155 and plate 12 clockwise about axis 14 (counterclockwise in FIG. 1) to the extent permitted by roller 199 abutting lever surface 198, the position of the lever being determined by cam 23.

In a typical case, where the gear G is to be finish cut from the solid by a plunge infeed followed by rough generation and then by finish generation, the piston 154 does not abut the left head of cylinder 155 during this initial advance of the plate 12. This initial advance brings the workpiece to a position just clear of the tools T. During the ensuing cutting operation, with the tools reciprocating, the cam 23 is rotated so that its infeed section 207 allows further clockwise motion of plate 12 by piston 154 to advance the work to full rough cutting depth relative to the tools T, while a dwell in cam 18, FIG. 2, holds the cradle and work spindle against rotation. Dwell section 208 of the cam 23 holds the plate 12 in this position during rough generation, for example while the cradle 2 is rotated clockwise in FIG. 1 by cam 18. Drop 209 of the cam 23 then allows the piston to move to its limit position to the left in cylinder 155, infeeding the work to finish cutting depth relative to the tools, the amount of such infeed depending upon the adjustment of block 163. Finish generation then occurs, during counterclockwise motion of the cradle 2 by cam 18, while dwell section 210 of cam 23 rotates beneath roller 191. The roller 199 does not contact lever surface 198, being held out of contact therewith by abutment of the piston against the left head of the cylinder which determines the position of plate 12 during finish cutting. After the finish cutting, the withdraw section 211 of cam 23 moves the plate 12 counterclockwise, opposed by pressure in the cylinder and line 205. This retracts the work clear of the tools T, to enable the indexing of the work, by means 12, 22, during the forepart of the ensuing clockwise rotation of the cradle by cam 18. The cutting cycle described is repeated for each tooth of the work gear. After completion of the last tooth, the plate 12 is withdrawn to work loading-unloading position by application of pressure to cylinder 155 through line 206, with line 205 being placed on exhaust.

It will be understood however by those skilled in the art, that the cams 18 and 23 may be arranged to perform other cutting cycles than the above described. As one example, for roughing without generation the lever 24 may be disengaged from cam 18, and the cradle clamped to the frame. In this case a cam 23 is used which is shaped simply to provide an infeed of the plate 12 to bring the work into full cutting depth relative to the tools and then a withdrawal of the plate for indexing of the work. As another example, for finishing gears which have been previously roughed, either with or without generation, the cam 23 may be so shaped as to hold the plate withdrawn, in the indexing position thereof, during the entire roll of the cradle in which work indexing is effected, and to allow the piston 154 to abut the left head of cylinder 155 during the opposite or cutting roll of the cradle.

Having now described the machine in its preferred form, I claim as my invention:

1. A bevel gear cutting machine having a rotatable cradle supporting a pair of guides for reciprocating tools, said guides being mounted on the cradle for (a) angular adjustment thereon relative to each other and to the cradle about an adjustment axis parallel to the cradle rotation axis, and (b) angular adjustment of each guide thereon about an axis perpendicular to said adjustment axis and to the direction of tool reciprocation.

2. A machine according to claim 1 in which each of said axes perpendicular to said adjustment axis intersects the latter.

3. A bevel gear cutting machine having a rotatable cradle, a pair of tooth angle adjustment brackets mounted on the cradle for adjustment thereon, relative to the cradle and to each other, about an axis parallel to the cradle rotation axis, a separate tool support mounted upon each of said brackets for adjustment thereon about an axis perpendicular to the adjustment axis of said brackets, and a tool supported for cutting motion on each of said supports.

4. A machine according to claim 3 in which said tools are secured to tool slides mounted on the respective tool supports for reciprocation thereon in paths perpendicular to the respective axes about which said supports are adjustable on the tool angle adjustment brackets.

5. A machine according to claim 4 in having means for reciprocating said slides in opposition to each other, said means comprising a double lever mounted for oscillation about the adjustment axis of the tooth angle adjustment brackets, and articulated connections between the opposite ends of said lever and the respective slides.

6. A cutting machine comprising a support member and a tool-carrying slide member reciprocable thereon, a pair of guide elements carried by one member and a pair of follower elements of said guides carried by the other member, for determining the path of reciprocation of a tool on the slide member, said guide elements being spaced from each other in the mean direction of said path and each being angularly adjustable on said one member to vary the inclination of their guide surfaces to said direction and thereby vary the curvature of said path, and one of said elements being mounted for motion back and forth, on the member which carries it, transversely of said direction and in a plane perpendicular to the angular adjustment axes of the guide elements, to shift the path of the tool.

7. A machine according to claim 6 in which said slide member is gibbed to the support member to confine it to reciprocation on a plane surface of the support member which is perpendicular to the angular adjustment axes of the guide elements.

8. A machine according to claim 6 in which there are means for reciprocating said slide member on the support member, and means operating in time with such reciprocation for effecting such back and forth motion of said one element, to cause the tool to follow different paths on its cutting and return strokes.

9. A machine according to claim 8 in which said one element is one of said follower elements and is carried by the support member.

10. A machine according to claim 8 in which said one element comprises an eccentric pin mounted for angular oscillation in the member, said oscillation constituting said back-and-forth motion.

11. A machine according to claim 8 in which said means for effecting back and forth motion of said one element comprises an hydraulic piston controlled by valve means actuated by the means for reciprocating the slide member.

12. A machine according to claim 8 for cutting bevel gears in which said support member is mounted on a rotatable cradle whose axis of rotation is perpendicular to the axes about which said guide elements are angularly adjustable and is approximately prependicular to said mean direction.

13. A bevel gear cutting machine having a rotatable cradle supporting a pair of tool slides for reciprocation in paths which are non-radial and approximately perpendicular to the cradle rotation axis and which are offset from each other in a plane of rotation of the cradle, drive means on the cradle for reciprocating the slides in opposition to each other, causing an oscillating torque to be applied to the cradle, and a counterweight mounted on the cradle for non-radial back-and-forth motion thereon substantially in a plane perpendicular to the cradle rotation axis, said drive means being connected with said counterweight for effecting said back-and-forth motion of the latter in torque-wise opposition to said slides, for counteracting said oscillating torque.

14. A bevel gear cutting machine having a rotatable cradle supporting a tool slide for reciprocation thereon, drive means on the cradle for reciprocating the slide in such manner that an oscillating torque is applied to the cradle, and a counterweight mounted on the cradle for non-radial back-and-forth motion thereon at least approximately in a plane of rotation of the cradle, said drive means being connected with said counterweight for effecting said back-and-forth motion of the latter in opposition to said oscillating torque.

15. A machine according to claim 14 in which said counterweight is pivoted to the cradle about an axis parallel to said cradle rotation axis, and at the mean point of its back-and-forth motion has its center of mass substantially in the plane common to its pivot axis and the cradle rotation axis.

16. A machine according to claim 14 in which said drive means comprises a first link and a lever pivoted to the cradle and pivotally connected to each other by a second link which, together with the cradle and said first link and lever, constitutes a parallelogram system, said lever being connected to said tool slide for effecting reciprocation of the latter upon oscillation of the lever, said second link having a cross slot therein, and a drive crank for said parallelogram system rotatable in the cradle and having its crank pin drivingly engaged in said cross slot.

17. A machine according to claim 16 in which said counterweight is pivoted to the cradle on the same axis as said first link, and there is a sliding pivot connection between said counterweight and said second link arranged to cause oscillation of said counterweight in angular opposition to said lever.

18. A bevel gear generating machine comprising a frame, a tool-carrying cradle mounted on the frame for rotation about a substantially horizontal axis, a work head supporting a work spindle for rotation therein, said work head being adjustable on the frame about a horizontal axis which is perpendicular to and intersects the cradle rotation axis, the axis of the work spindle also intersecting said axes and inclining downwardly in a direction away from the front of the cradle, and a pair of tools mounted on the front of cradle for reciprocation thereon approximately at right angles to said cradle rotation axis.

19. A machine according to claim 18 in which said tools are mounted on the cradle for reciprocation in paths thereon which are approximately upright at the mid-point of gear tooth generation, and said tools being adapted for cutting during the upward strokes thereof.

20. A bevel gear generating machine comprising a frame, a tool-carrying cradle rotatable on the frame, a work head rotatably supporting a work spindle, an advance-withdraw plate supporting said work head for angular adjustment thereon about an axis that is in perpendicular intersecting relation to both the cradle rotation axis and the work spindle rotation axis, and said plate being supported for pivotal motion on the frame, about an axis parallel to the axis of angular adjustment of the work head and spaced therefrom in a direction approximately perpendicular to the cradle rotation axis, to advance and retract a work gear on the work spindle relative to tool means on the cradle.

21. A machine according to claim 20 in which said work head is supported by a swinging base for adjustment thereon in the direction of the work spindle rotation axis, and said swinging base is supported by said advance-withdraw plate for the angular adjustment thereon which provides the afore-mentioned angular adjustment of the work head about an axis perpendicular to both the cradle rotation axis and the work spindle rotation axis.

22. A machine according to claim 20 having a member pivoted to the frame and supporting said advance-withdraw plate, said plate being rectilinearly adjustable on said member in a direction which is parallel to the cradle rotation axis when the plate is in its limit position of angular advance toward the cradle.

23. A machine according to claim 22 in which there is a pressure actuated piston-cylinder device arranged to act between the frame and said advance-withdraw plate for effecting angular motion of said advance-withdraw plate, and means to adjust said device relative to one of said frame and said plate to thereby vary said limit position of advance of the plate toward the cradle.

24. A machine acording to claim 23 in which said adjustment of said device is relative to said advance-withdraw plate and is a rectilinear adjustment parallel to the adjustment of the plate on said member pivoted to the frame.

25. A machine according to claim 24 in which there is an adjustable-length brace pivoted at one end to said work head on the side thereof opposite to said advance-withdraw plate, said brace being pivoted at its opposite end to the frame on the same axis that said member pivoted the frame but in axially spaced relation to said member.

26. A machine according to claim 23 in which there is a cam rotatable in the frame for effecting withdrawal of said plate about its pivot to the frame in opposition to pressure applied by said piston-cylinder device.

27. A machine according to claim 26 in which said cam acts against said plate through a cam follower and an adjustable-length lever.

28. A bevel gear generating machine comprising a frame, a tool-carrying cradle rotatable in the frame, a work head rotatably supporting a work spindle, an advance-withdraw plate supporting the work head for angular adjustment thereon about an axis that is perpendicular to both the cradle rotation axis and the work spindle rotation axis, said plate movable on the frame toward and away from the cradle, a fluid pressure actuated piston-cylinder device acting between the frame and plate for effecting such motion and by abutment of the piston in the cylinder limiting advance motion of the plate, means for effecting angular oscillation of the cradle and the spindle about their respective axes, and a cam rotatable in the frame and driven by said means in time with such oscillation for effecting motion of said plate away from the cradle in opposition to pressure exerted by said device.

29. A machine according to claim 28 in which a lever fulcrumed to said frame and a follower for the lever carried by said plate are arranged to transmit motion from said cam to said plate, and means for adjusting said follower on said plate toward and from said fulcrum, to vary the magnitude of the plate withdrawal motion effected by the cam.

30. A gear generating machine comprising a tool support upon which tool means are mounted for cutting motion, a rotatable work spindle and a support therefor, said supports being arranged for relative movement in time with rotation of the spindle to effect rolling generating motion between a work gear on the spindle and said tool means, a generating drive train comprising a first slide connected to the movable one of said supports, a second slide, means connecting said slides to cause their motions to be proportionate, said means being adjustable to vary the effective proportion, a rotary shaft connected to the spindle and having a ball-nut and screw connection with said second slide for causing rotation of said shaft to be proportionate to motion of said slides, and ratio change gearing in the connection between said shaft and said spindle.

31. A machine according to claim 30 in which said means connecting said slides comprise a lever which is adjustable to vary the relative effective lengths of its lever arms.

32. A machine according to claim 30 in which there is a rotary cam arranged to reciprocate said first slide, to thereby actuate said generating train.

33. A machine according to claim 32 in which there is a differential gear set in said connection between said shaft and said spindle, and an indexing mechanism actuated in time with said cam for intermittently advancing the spindle angularly relative to said shaft.

34. A machine according to claim 30 in which the movable one of said supports is a rotary cradle, and the connection of said cradle to the first slide comprises flexible bands for rotating the cradle in proportion to rectilinear motion of the slide.

References Cited by the Applicant

UNITED STATES PATENTS

| | | |
|---|---|---|
| 678,385 | 7/1901 | Ferris. |
| 1,625,722 | 4/1927 | Harbeck. |
| 1,730,637 | 10/1929 | White. |
| 1,925,726 | 9/1933 | Carlsen. |
| 2,385,330 | 9/1945 | Candee et al. |
| 2,385,331 | 9/1945 | Carlsen. |
| 2,432,020 | 12/1947 | Laesser. |

FOREIGN PATENTS

| | | |
|---|---|---|
| 501,097 | 2/1949 | Great Britain. |
| 692,344 | 6/1953 | Great Britain. |
| 724,262 | 2/1955 | Great Britain. |

WILLIAM W. DYER, JR., *Primary Examiner.*